US012524674B2

(12) United States Patent
Vemulapalli et al.

(10) Patent No.: US 12,524,674 B2
(45) Date of Patent: Jan. 13, 2026

(54) SUBTASK ADAPTABLE NEURAL NETWORK

(71) Applicant: Google LLC, Mountain View, CA (US)

(72) Inventors: Raviteja Vemulapalli, Seattle, WA (US); Jianrui Cai, Cupertino, CA (US); Bradley Ray Green, Bellevue, WA (US); Ching-Hui Chen, Shoreline, WA (US); Lior Shapira, Redmond, WA (US)

(73) Assignee: GOOGLE LLC, Mountain View, CA (US)

( * ) Notice: Subject to any disclaimer, the term of this patent is extended or adjusted under 35 U.S.C. 154(b) by 404 days.

(21) Appl. No.: 18/009,629

(22) PCT Filed: Jun. 10, 2020

(86) PCT No.: PCT/US2020/036973
§ 371 (c)(1),
(2) Date: Dec. 9, 2022

(87) PCT Pub. No.: WO2021/251960
PCT Pub. Date: Dec. 16, 2021

(65) Prior Publication Data
US 2023/0214656 A1 Jul. 6, 2023

(51) Int. Cl.
*G06N 3/00* (2023.01)
*G06N 3/082* (2023.01)
*G06V 10/764* (2022.01)
*G06V 10/82* (2022.01)

(52) U.S. Cl.
CPC ........... *G06N 3/082* (2013.01); *G06V 10/764* (2022.01); *G06V 10/82* (2022.01)

(58) Field of Classification Search
CPC ........ G06N 3/082; G06N 3/045; G06N 3/047; G06N 3/084; G06V 10/764; G06V 10/82
See application file for complete search history.

(56) References Cited

U.S. PATENT DOCUMENTS

2019/0251441 A1    8/2019 Lu et al.

OTHER PUBLICATIONS

Hu et al, DRNet: Dissect and Reconstruct the Convolutional Neural Network via Interpretable Manners, arXiv:1911.08691v2 Feb. 26, (Year: 2020).*
Sun et al, Learning Sparse Sharing Architectures for Multiple Tasks, The Thirty-Fourth AAAI Conference on Artificial Intelligence (AAAI-20) (Year: 2020).*
Mallya et al, PackNet: Adding Multiple Tasks to a Single Network by Iterative Pruning, CVPR (Year: 2018).*

(Continued)

*Primary Examiner* — Xiao Liu
(74) *Attorney, Agent, or Firm* — DORITY & MANNING P.A.

(57) ABSTRACT

At training time, a base neural network can be trained to perform each of a plurality of basis subtasks included in a total set of basis subtasks (e.g., individually or some combination thereof). Next, a description of a desired combined subtask can be obtained. Based on the description of the combined subtask, a mask generator can produce a pruning mask which is used to prune the base neural network into a smaller combined-subtask-specific network that performs only the two or more basis subtasks included in the combined subtask.

14 Claims, 8 Drawing Sheets

(56) References Cited

OTHER PUBLICATIONS

Liu et al, Learning Efficient Convolutional Networks through Network Slimming, ICCV (Year: 2017).*
Liu et al, MetaPruning: Meta Learning for Automatic Neural Network Channel Pruning, IEEE/CVF (Year: 2019).*
International Preliminary Report on Patentability for Application No. PCT/US2020/036973, mailed Dec. 22, 2022, 12 pages.
Machine Translated Chinese Search Report Corresponding to Application No. 202080101932.9 on Jun. 28, 2024.
Liu et al., "MetaPruning: Meta Learning for Automatic Neural Network Channel Pruning.", arXiv:1903.10258v3, Aug. 14, 2019, 10 pages.
Strezoski et al., "Many Task Learning with Task Routing.", arXiv:1903.12117v1, Mar. 28, 2019, 10 pages.
Yu et al., "Universally Slimmable Networks and Improved Training Techniques.", arXiv:1903.05134v2, Oct. 20, 2019, 11 pages.
Entezari et al., "Class-dependent Pruning of Deep Neural Networks", arXiv:1909.10364v2, dated Feb. 18, 2020, 6 pages.
Hu et al., "DRNet: Dissect and Reconstruct the Convolutional Neural Network via Interpretable Manners", arXiv:1911.08691v2, dated Feb. 26, 2020, 8 pages.
International Search Report for Application No. PCT/US2020/036973, mailed Mar. 22, 2021, 2 pages.
Liu et al., "Learning Efficient Convolutional Networks through Network Slimming", IEEE international conference on computer vision, 2017, pp. 2736-2744.
Mallya et al., "PackNet: Adding Multiple Tasks to a Single Network by Iterative Pruning", IEEE conference on Computer Vision and Pattern Recognition, 2018, pp. 7765-7773.
Sun et al., "Learning Sparse Sharing Architectures for Multiple Tasks", arXiv:1911.05034vl, dated Nov. 12, 2019, 8 pages.

* cited by examiner

SUBTASK ADAPTABLE NEURAL NETWORK

PRIORITY CLAIM

This application is based upon and claims the right of priority under 35 U.S.C. § 371 to International Application No. PCT/US2020/036973 filed on Jun. 10, 2020, which is incorporated by reference herein.

FIELD

The present disclosure relates generally to machine learning. More particularly, the present disclosure relates to a systems and methods for generating, training, and using a subtask adaptable neural network that includes a base network which may be adapted to efficiently perform a dynamic and controllable subset of different subtasks.

BACKGROUND

Over the past few years, several neural network architectures have been proposed that consistently improved the state-of-the-art performance for various computer vision tasks. Typically, the size of the deep network used for a task depends on the complexity of the task. As such, one would need a significantly larger network for recognizing 1000 categories when compared to recognizing just 10 categories.

However, given a deep network that has been trained to recognize a large number of categories, one needs to run the entire network even when they are interested only in a smaller subset of categories which could potentially be recognized using a much smaller network. This happens frequently in several real-world use cases of deep networks where one unified model is built to serve multiple applications.

Thus, while having a unified model gives the flexibility of serving several applications, it leads to inference-time inefficiency for applications that are interested only in a subset of categories. This often prevents these applications from using the large unified model due to computational budget or other resource constraints.

SUMMARY

Aspects and advantages of embodiments of the present disclosure will be set forth in part in the following description, or can be learned from the description, or can be learned through practice of the embodiments.

One example aspect of the present disclosure is directed to a computing system with a subtask adaptable neural network. The computing system includes one or more processors and one or more non-transitory computer-readable media that collectively store: a subtask adaptable neural network that comprises a base neural network that comprises a plurality of parameters, wherein the base neural network has been trained to perform each of a plurality of basis subtasks included in a total set of basis subtasks; and instructions that, when executed by the one or more processors, cause the computing system to perform operations. The operations include receiving data descriptive of a combined subtask that comprises two or more basis subtasks, the combined subtask being a subset of the total set of basis subtasks for which the base neural network has been trained. The operations include generating a combined-subtask-specific pruning mask based on the combined subtask, wherein the combined-subtask-specific pruning mask identifies a subset of the plurality of parameters of the base neural network to be pruned. The operations include pruning the subset of the plurality of parameters of the base neural network identified by the combined-subtask-specific pruning mask to generate a combined-subtask-specific neural network. The operations include, after pruning the subset of the plurality of parameters, providing the combined-subtask-specific neural network for performance of the combined subtask.

Another example aspect of the present disclosure is directed to a computer-implemented method to train a subtask adaptable neural network. The method includes obtaining, by a computing system comprising one or more computing devices, a subtask adaptable neural network that comprises a base neural network that comprises a plurality of parameters. Portions of the method can be performed for a plurality of training iterations. The method includes receiving, by the computing system, data descriptive of a combined subtask that comprises two or more basis subtasks, the combined subtask being a subset of a total set of a plurality of basis subtasks. The method includes generating, by the computing system, a combined-subtask-specific pruning mask based on the combined subtask, wherein the combined-subtask-specific pruning mask identifies a subset of the plurality of parameters of the base neural network to be pruned. The method includes pruning, by the computing system, the subset of the plurality of parameters of the base neural network identified by the combined-subtask-specific pruning mask to generate a combined-subtask-specific neural network. The method includes after pruning the subset of the plurality of parameters, using, by the computing system, the combined-subtask-specific neural network to generate an output based on a training input. The method includes evaluating, by the computing system, a loss function that evaluates the output. The method includes modifying, by the computing system, one or more values of one or more of the parameters of the base neural network based at least in part on the loss function. The respective combined subtasks for at least two of the plurality of training iterations can differ from each other.

Another example aspect of the present disclosure is directed to one or more non-transitory computer-readable media that collectively store a combined-subtask-specific neural network generated from a base neural network. The combined-subtask-specific neural network is configured to perform a combined subtask that comprises two or more basis subtasks. The combined subtask is a subset of a total set of basis subtasks on which the base neural network was trained. The combined-subtask-specific neural network was generated via pruning of a subset of a plurality of parameters of the base neural network identified by a combined-subtask-specific pruning mask associated with the combined subtask. The non-transitory computer-readable media further collectively store instructions that, when executed by one or more computing devices, cause the one or more computing devices to use the combined-subtask-specific neural network for performance of the combined subtask.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
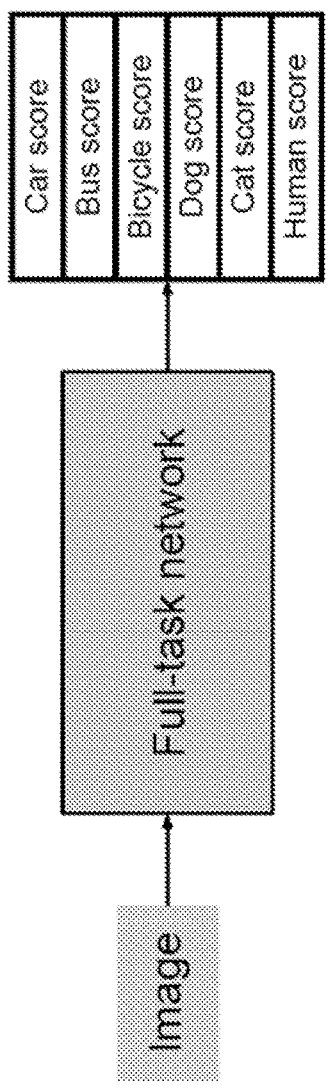
FIGS. 1A-C provide a graphical depiction of an example pruning of a base network for different subtasks according to example embodiments of the present disclosure.

Reference numerals that are repeated across plural figures are intended to identify the same features in various implementations.

DETAILED DESCRIPTION

1. Overview

Generally, the present disclosure is directed to a Subtask Adaptable Network (SAN) that includes a unified base neural network and a subtask-specific pruning mask generator. At training time, the base neural network can be trained to perform each of a plurality of basis subtasks included in a total set of basis subtasks (e.g., individually or some combination thereof). As one example, the plurality of basis subtasks can be a plurality of recognition tasks respectively associated with a plurality of different object classes (e.g., giraffe, elephant, ostrich, dinosaur, and parachute). Next, a description of one or more desired subtasks can be obtained. For example, a combined subtask can include two or more of the basis subtasks (e.g., a subset of categories of interest such as only giraffe and elephant, but not ostrich, dinosaur, or parachute). Based on the description of the combined subtask, the mask generator can produce a pruning mask which is used to prune the base neural network into a smaller combined-subtask-specific network that performs only the one or more basis subtasks included in the described subtask. As such, the combined-subtask-specific network can be used to more efficiently perform inference for only the desired task(s). Furthermore, both the base recognition network and the mask generator can be learned together using end-to-end training.

Figure 1B:
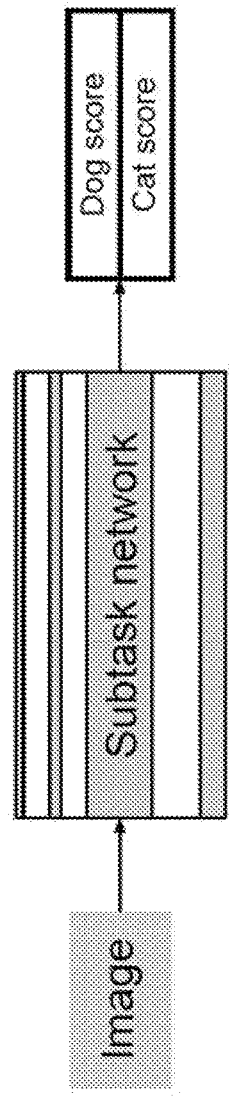
Figure 1C:
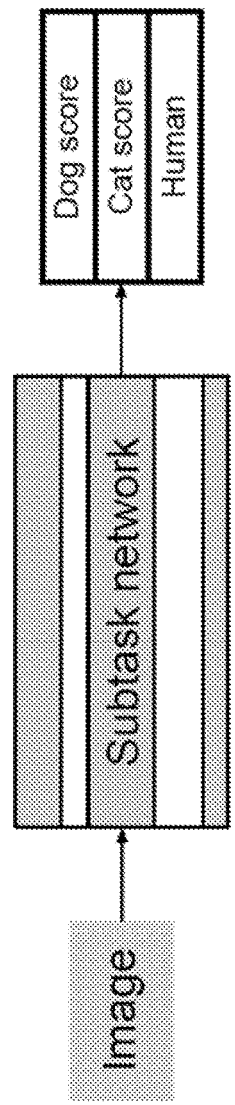

FIGS. 1A-C provides an example illustration of dynamic subtask-specific network pruning in the example context of object recognition. Specifically, FIG. 1A depicts a base neural network configured to perform a plurality of basis subtasks, which in this example correspond to different object recognition tasks. FIG. 1B shows a first subtask-specific network that has been pruned to perform only a first subtask, which in this example corresponds to recognizing dogs and cats. As another example, FIG. 1C shows a second subtask-specific network that has been pruned to perform a second set of subtasks, which in this example corresponds to recognizing dogs, cats, and humans. Thus, a base network can be dynamically pruned based on a specific, and dynamically selectable group of basis subtasks.

The systems and methods of the present disclosure are the first to provide a dynamic and controllable subtask-specific pruning approach. More particularly, while the possibility of task-specific network pruning has been explored in earlier works, most of these works focus on pruning for a single defined task, rather than pruning for a dynamic and controllable subset of tasks. Thus, in contrast to prior approaches, the systems and methods described herein can train a single network that can be pruned (e.g., without re-training) for different subtasks at inference time using a learned subtask-specific mask generator.

Another related, but different, line of work is Multi-Task Learning (MTL), which focuses on training a single large network for several different tasks. Different from MTL, the systems and methods of the present disclosure reduce the computational cost by pruning the network when an application is only interested in a (proper) subset of tasks (e.g., a subset of classes or categories) capable of being performed by the full network.

The systems and methods of the present disclosure provide a number of technical effects and benefits. As one example, the systems and methods of the present disclosure provide a significantly more efficient inference-time model as compared to typical MTL approaches. More particularly, past MTL approaches train a single large model to perform multiple different tasks. However, at inference-time, the entire large model is then used to perform inference, even when it is actually desired to perform only a subset of the multiple different tasks, which is an inefficient approach and undesirably consumes computing resources such as processor usage, memory usage, network bandwidth, etc. In contrast, the present disclosure provides techniques which generate a pruning mask which is used to prune the base neural network into a smaller combined-subtask-specific network that performs only the subset of tasks included in the specified combined subtask, thereby conserving computing resources such as processor usage, memory usage, network bandwidth, etc. The smaller combined-subtask-specific network may therefore be suitable for use on resource-constrained devices (such as portable computing devices including smartphones, tablets, wearables etc.) on which it is not possible or appropriate to utilize the full base neural network.

As another example technical effect and benefit, the present disclosure provides significant resource savings as compared to approaches that train, store, and use a separate model for every single task. For example, for 100 tasks, one prior approach would be to train, store, and use 100 different models. The present disclosure represents a significant advance beyond this approach by performing only a single training of a single base network and then using the proposed pruning approach to generate (e.g., in advance or in real-time) model(s) that are capable of performing any subset of the tasks. Thus, the allocation of computing resources to model training can be reduced (e.g., from one hundred separate training events to a single training event).

As another example, the end result provided by the present disclosure is also significantly more flexible and of higher performance than the prior approach: A model can be generated for any combined subset of one or more tasks and the produced model will have benefited from cross-task learning, thereby likely resulting in higher performance.

With reference now to the Figures, example embodiments of the present disclosure will be discussed in further detail.

2. Example Subtask Adaptable Network

Figure 2:
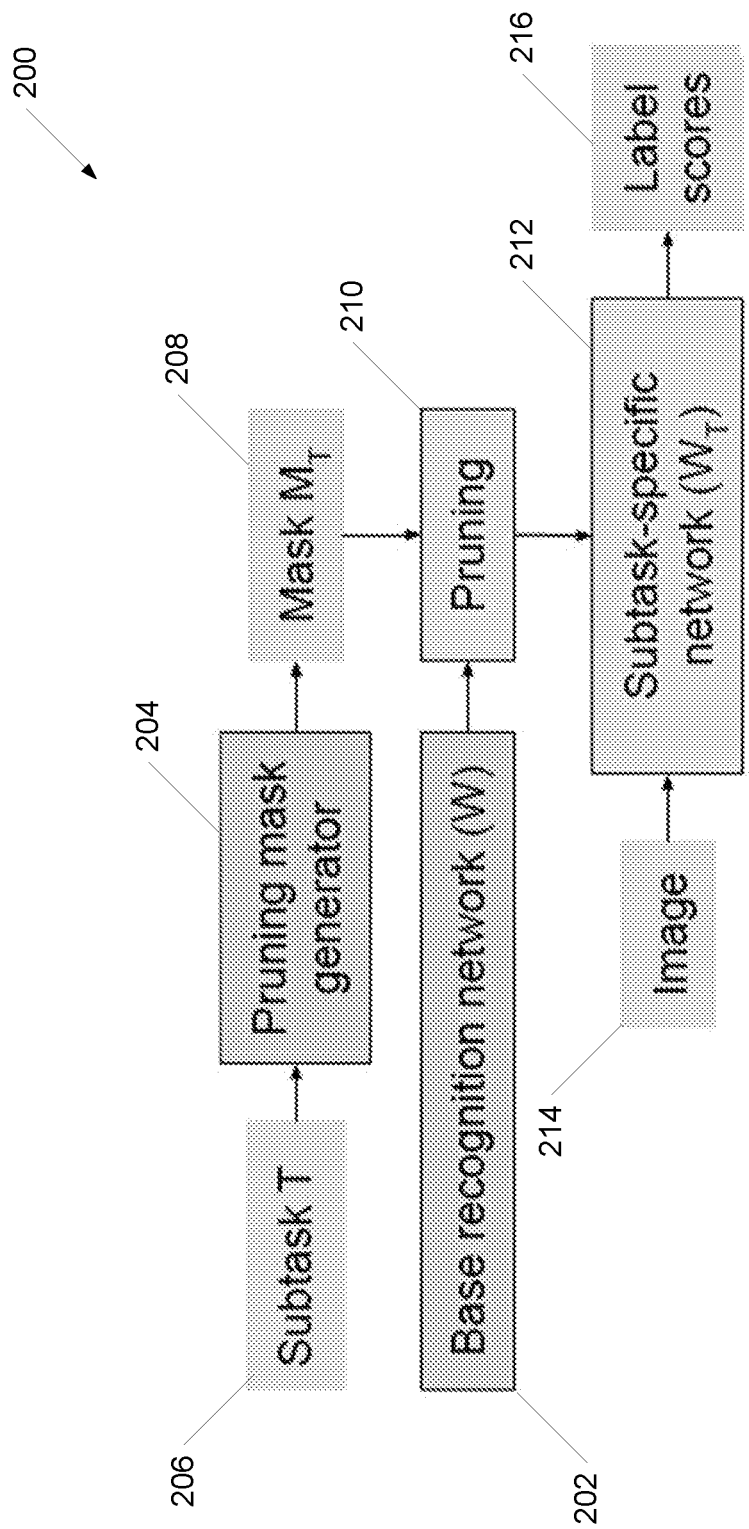
FIG. 2 provides a block diagram of an example subtask adaptable network according to example embodiments of the present disclosure.

This section describes an example subtask adaptable network (SAN). Specifically, as an example, FIG. 2 depicts an example SAN 200 which includes two main components: a unified base neural network 202, which may be referred to as BaseNet, and a subtask-specific pruning mask generator 204. The same base neural network 202 can be pruned (e.g., using mask(s) generated by the generator 204) for different subtasks, without re-training.

In the sections that follow, an example SAN is described in an example context/use case in which the different basis subtasks correspond to different classes of objects to be recognized. This is one example setting only. The systems and methods described herein are applicable to any different form of task and any different form of input data modality (e.g., input data representative of text, input data representative of audio, etc.).

2.1 Example Base Neural Network

One example BaseNet 202 is a convolutional neural network that produces a score (e.g. in the range [0, 1]) for each of a plurality of categories using category-specific (e.g. sigmoid) functions in the output layer. Let N denote the total number of convolutional filters in all the layers of the base recognition network.

2.2 Example Pruning Mask Generator

For the example SAN 200, a basis subtask can be defined as a subset of tasks (e.g., categories) that will always be performed (e.g., recognized) together. Thus, a basis subtask can include one or more tasks such as one or more (e.g., two, three, etc.) different sets of objects that will always be recognized together. A combined subtask can be defined as a combination of two or more basis subtasks.

Based on these definitions, the set of all subtasks $\mathcal{T}$ supported by a SAN can be divided into two groups: the set of basis subtasks $\mathcal{T}_b$ and the set of combined subtasks $\mathcal{T}_c$. In the example in FIGS. 1A-C, {Cat, Dog}, {Human} and {Car, Bus, Bicycle} can be three basis subtasks, and the corresponding combined subtasks are {Dog, Cat, Human}, {Cat, Dog, Car, Bus, Bicycle}, {Car, Bus, Bicycle, Human} and {Cat, Dog, Car, Bus, Bicycle, Human}.

Referring again to example illustrated in FIG. 2, for a subtask $T \in \mathcal{T}$ (e.g., a basis subtask or a combined subtask) 206, the mask generator 204 produces a binary mask 208 that consists of a binary value for each convolutional filter in the BaseNet 202 indicating whether that particular filter should be on or off for subtask T 206. While the mask 208 is described here as providing a value for each filter of the network, other example masks can provide a respective value for each layer of the network, each parameter of the network, or other divisions of parameters of the network.

In some example implementations to produce the binary mask 208, the generator 204 first produces a positive-valued mask $$U_T \in \mathcal{R}_+^N,$$

referred to as utility mask, and then binarizes it using an element-wise thresholding function:

$$BI(u_T) = \begin{cases} 0 & if u_T < thr \\ 1 & \text{otherwise.} \end{cases} \quad (1)$$

In some example implementations, the mask generator 204 can produce a separate learned utility mask $U_T$ for each of the basis subtasks. The mask generator 204 can combine these basis utility masks to generate the utility masks for combined subtasks. For example, given utility masks $U_{T_1}$ and $U_{T_2}$ for subtasks $T_1$ and $T_2$, respectively, the utility mask for the combined subtask $T_1 \cup T_2$ can be generated using $U_{T_1 \cup T_2} = \text{Max}(U_{T_1}, U_{T_2})$, where Max denotes the element-wise max operation. So, a filter is active for subtask $T_1 \cup T_2$ if it is active for at least one of the subtasks $T_1$ and $T_2$.

Given the binarized utility mask 208 for task T 206, a pruning operation 210 can be performed to switch off (or omit) the filters whose corresponding mask elements are zero to get a corresponding subtask-specific network 212. After pruning, the subtask-specific network 212 can be used to process an input image 214 to generate label scores 216 for only the categories included in the subtask 206.

Figure 3:
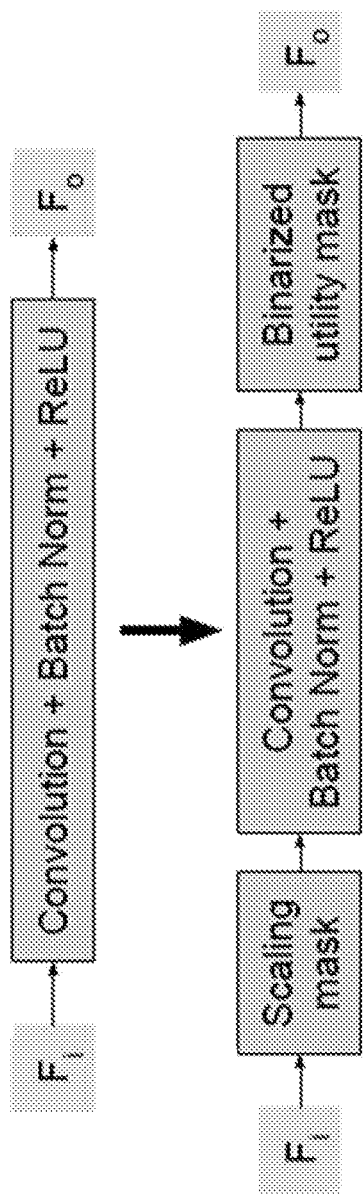
FIG. 3 provides a block diagram of an example convolutional layer according to example embodiments of the present disclosure.

In some implementations, since switching off filters in a layer affects the overall magnitude of the inputs to the next layer, to compensate for this, a subtask-specific scaling mask $S_T$ is used which adds per-channel scaling factors to the inputs of all convolution layers (e.g., except the first convolution layer that takes image as input), as shown in FIG. 3. Specifically, as shown in FIG. 3, in some implementations, each convolution layer can have subtask-specific scaling and utility masks associated with it. In some implementations, in a residual network, the same utility mask can be used for all the inputs contributing to a residual operation.

Thus, referring again to FIG. 2, similar to utility masks, the pruning mask generator 204 can, in some example implementations, use separate learned scaling masks $S_T$ for each of the basis subtasks, and the scaling masks for combined subtasks can be generated by combining the basis scaling masks. For example, given scaling masks $S_{T_1}$ and $S_{T_2}$ for subtasks $T_1$ and $T_2$, respectively, the scaling mask for the combined subtask $T_1 \cup T_2$ can be generated using $$S_{T_1 \cup T_2} = \text{MaxAbs}(S_{T_1}, S_{T_2}) \quad (2)$$

where MaxAbs denotes the element-wise operation of selecting the value with the larger magnitude while retaining its sign. Thus, in some implementations, the overall pruning mask $M_T$ 208 produced by the mask generator 204 for a subtask T 206 can include a utility mask $U_T$ and a scaling mask Sr.

While this section describes example implementations of the pruning mask generator 204 which directly optimize/learn per-task utility masks and/or scaling masks, other example implementations of the present disclosure include more sophisticated mask generators 204. As one example, an example pruning mask generator 204 can include one or more neural networks that directly regresses subtask-specific masks. For example, optimal values for the parameters of such mask-generating neural network(s) can be learned in a similar fashion to how the optimal values for the masks are learned in the direct learning embodiment.

In some implementations, the generation of the subtask-specific network 212 shown in FIG. 2 can be performed in real-time in response to receipt of the input image 214 and a description of the subtask 206. Stated differently, the generation/pruning process can be performed at the same time as it is desired to run the network 212 to generate the label scores 216 from the input image 214. The generating/pruning can be performed by the same device or a different device as the device which runs the network 212 to generate the label scores 216 from the input image 214.

In other implementations, the generation of the subtask-specific network 212 shown in FIG. 2 can be performed in advance of the planned use of the network 212 for inference and then stored for later use. Stated differently, the generation/pruning process can be performed at some time prior to the time at which it is desired to perform the running of the network 212 to generate the label scores 216 from the input image 214 and the network 212 can be stored and then later used. The generating/pruning can be performed by the same device or a different device as the device which runs the network 212 to generate the label scores 216 from the input image 214. For example, the generating/pruning can be performed by a central entity (e.g., server device or service layer or platform) as a service for clients (e.g., remote devices, applications, etc.). For instance, a server device may carry out the generation/pruning process and provide the resulting network for use at a remote device. In another example, the generation/pruning process may be performed by a service layer or component of a device (which may be referred to as a "pruning engine") and may be provided for use by an application also residing on that device.

2.3 Example Loss Functions

Let C represent the set of all tasks (e.g., categories) and |C| represent its cardinality. Let $\vec{y}_I \in [0,1]^{|c|}$ denote the task (e.g., category) scores produced by a model for an input I (e.g., an image), and $\vec{1}_I \in \{0,1\}^{|c|}$ denote the binary vector indicating the groundtruth labels of I.

One example subtask loss $\mathcal{L}^T$ for a subtask T can be defined as $$\mathcal{L}^T = \frac{\beta \sum_{c \in T} CE(\vec{y}_I(c), \vec{1}_I(c)) + \sum_{c \in C, c \notin T} CE(\vec{y}_I(c), \vec{1}_I(c))}{\alpha}, \quad (3)$$

where $\alpha = (|C| + (\beta - 1)|T|)/|C|$ is a normalization factor and CE is the standard binary cross entropy loss. The first term in $\mathcal{L}^T$ corresponds to the tasks (e.g., categories) that define subtask T and the second term corresponds to all the remaining tasks (e.g., categories).

One example full-task loss $\mathcal{L}^{FT}$ for all categories can be defined as $$\mathcal{L}^{FT} = \sum_{c \in C} CE(\vec{y}_I(c), \vec{1}_I(c)). \quad (4)$$

While the full-task loss gives equal weightage to all the categories, subtask loss gives higher weightage (e.g., $\beta$ is set to a large value) to the categories defining the subtask. Including the categories that are not part of the subtask with a small weight improves the stability and speed of training.

2.4 Example Training Scheme

During training, the utility and scaling masks $\{(U_T, S_T)\}$ for the basis subtasks and the parameters W of BaseNet can be learned jointly by training the SAN in an end-to-end fashion. Let $$\mathcal{L}_{PN}^T$$

denote the subtask loss applied to the output of the network pruned for subtask T and $$\mathcal{L}_{BN}^{FT}$$

denote the full-task loss applied to the output of BaseNet. As one example, the training of SAN can be formulated as the following optimization problem that tries to minimize the loss over all subtasks:

$$\min_{W, \{(U_T, S_T)\}_{T \in \mathcal{T}_b}} \mathcal{L}_{BN}^{FT} + \frac{1}{|\mathcal{T}|} \sum_{T \in \mathcal{T}} \left( \mathcal{L}_{PN}^T + \frac{\gamma}{N} \|U_T\|_1 \right), \quad (5)$$

where $\|U_T\|_1$ is the sparsity-inducing $\ell_1$ loss that encourages network pruning, and y is a hyper-parameter that can be used to vary the amount of pruning.

Note that the proposed mask generator uses a thresholding operation whose derivative is zero everywhere. So, to train the network using standard gradient-based methods one can use straight-through estimator while backpropagating the gradients. Also, in some implementations, the utility mask $U_T$ is constrained to be positive. This can be handled by replacing positive-valued $U_T$ with real-valued variables and use an absolute value operator both in forward and backward propagations.

In some implementations, at the beginning of the training, the scaling masks can be initialized with all ones and utility masks using zero mean Gaussian with standard deviation a. The value of a influences the magnitude of initial utility masks and hence can bias the model towards high/low amounts of pruning. So, along with y, a can also be used to vary the amount of pruning.

In some implementations, the loss function (e.g., Eq. (5)) can be backpropagated through any combination of the subtask-specific network 212, the base network 202, and/or the pruning mask generator 204. In some implementations, modifications to the subtask-specific network 212 and the base network 202 can be averaged. Modifications to the subtask-specific network 212 can be returned or passed along to the base network 202.

2.4.1 Example Loss Sampling Technique

The above loss function can in some scenarios include a large number (exponential in the number of basis subtasks) of loss terms $$\mathcal{L}_{PN}^T,$$

and it may not be possible to compute the gradients for all the terms in one iteration even for a small minibatch due to hardware memory limitations. Hence, in some implementations, a single subtask can be sampled in each iteration for computing the gradients, i.e., in each iteration $$\mathcal{L}_{BN}^{FT}$$

and one $$\mathcal{L}_{PN}^{T}$$

are used for back-propagation. As one example sampling configuration, a strategy can be followed that ensures that the sampled subtask is one of the basis subtasks with a first probability $$\left(\text{e.g.}, \frac{1}{3}\right),$$

the combination of all basis subtasks with second probability $$\left(\text{e.g.}, \frac{1}{3}\right),$$

and one of the remaining combined subtasks with a third probability $$\left(\text{e.g.}, \frac{1}{3}\right).$$

While this particular strategy is one example that can be performed, various other sampling strategies can also be used instead or in addition.

2.5 Example Inference Scheme

When BaseNet uses batch normalization layers, the mean and variance statistics used by batch normalization vary based on the subtask due to turning off some filters. So, before using the network for inference of a subtask, the subtask-specific batch normalization mean and variance statistics need to be computed by running the corresponding pruned network on a set of images. While this adds an extra step in between training and inference stages, the additional overhead is negligible when compared to training a separate model for each subtask.

3. Example Methods

Figure 4:
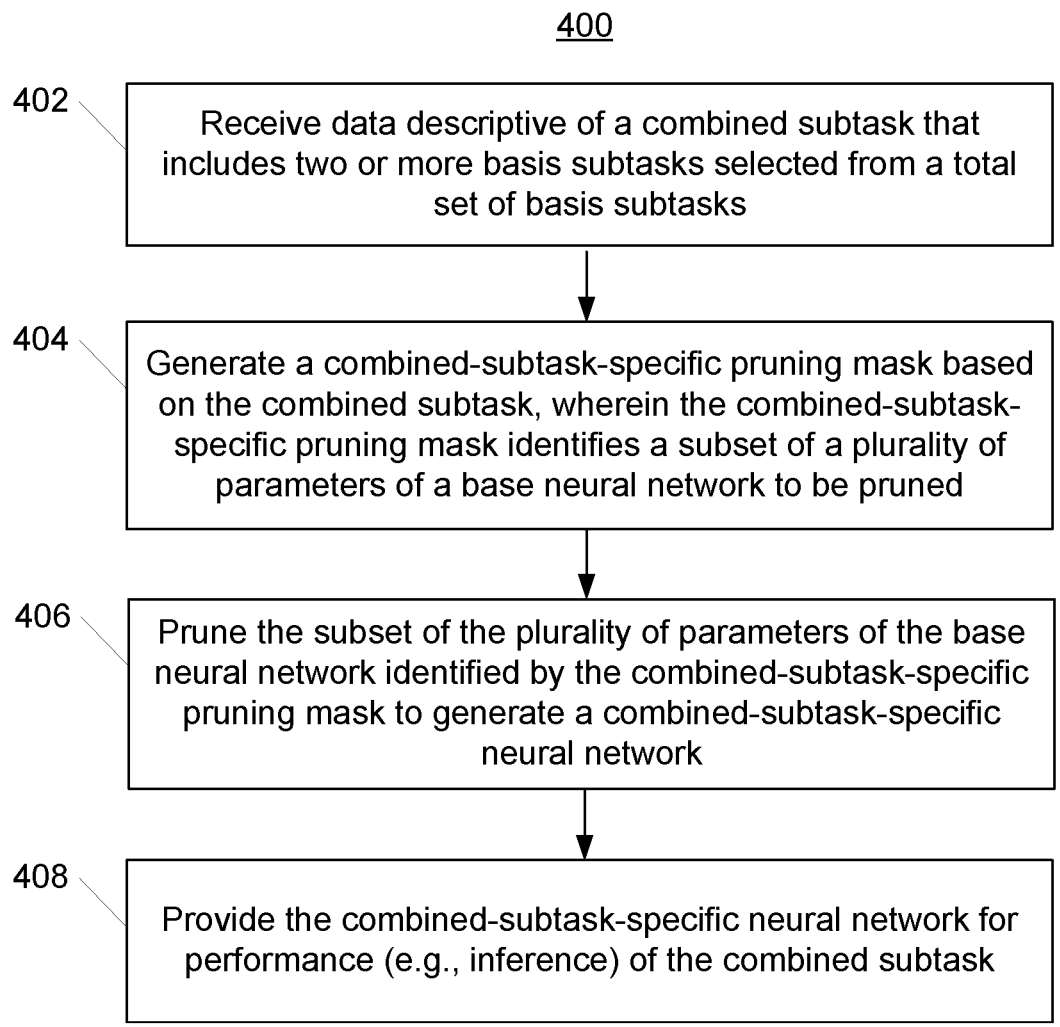
FIG. 4 provides a flow chart diagram of an example method to generate a combined-subtask-specific neural network according to example embodiments of the present disclosure.

FIG. 4 depicts a flow chart diagram of an example method to generate a combined-subtask specific network according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can receive data descriptive of a combined subtask that includes two or more basis subtasks, the combined subtask being a subset of the total set of basis subtasks for which the base neural network has been trained.

In some implementations, the plurality of basis subtasks are a plurality of recognition tasks respectively associated with a plurality of different object classes. In some of such implementations, the data descriptive of a combined subtask identifies two or more of the plurality of different object classes. In some implementations, at least one of the plurality of basis subtasks includes classifying an input into two or more different classes.

At 404, the computing system can generate a combined-subtask-specific pruning mask based on the combined subtask, wherein the combined-subtask-specific pruning mask identifies a subset of the plurality of parameters of the base neural network to be pruned.

In some implementations, generating the combined-subtask-specific pruning mask based on the combined subtask can include accessing from storage two or more predetermined utility masks respectively associated with the two or more basis subtasks included in the combined subtask. In some implementations, generating the combined-subtask-specific pruning mask based on the combined subtask can include combining the two or more predetermined utility masks to generate a combined-subtask-specific utility mask. In some implementations, combining the two or more predetermined utility masks to generate the combined-subtask-specific utility mask includes performing, on an element-by-element basis, a maximum operator for the two or more predetermined utility masks.

In some implementations, generating the combined-subtask-specific pruning mask based on the combined subtask can include binarizing the combined-subtask-specific utility mask to generate the combined-subtask-specific pruning mask. In some implementations, binarizing the combined-subtask-specific utility mask to generate the combined-subtask-specific pruning mask can include comparing, on an element-by-element basis, each value of the combined-subtask-specific utility mask to a threshold value, wherein values less than the threshold value are set to zero and values greater than the threshold value are set to one.

In some implementations, the subtask adaptable neural network further includes a pruning mask generation neural network. In some implementations, generating the combined-subtask-specific pruning mask based on the combined subtask can include: inputting the data descriptive of the combined subtask into the pruning mask generation neural network; and receiving the combined-subtask-specific pruning mask as an output of the pruning mask generation neural network, the combined-subtask-specific pruning mask produced by the pruning mask generation neural network based on the data descriptive of the combined subtask.

In some implementations, the base neural network can be a convolutional neural network that includes a plurality of filters. In some implementations, the combined-subtask-specific pruning mask identifies, on a filter-by-filter basis, a subset of the plurality of filters of the base neural network to be pruned.

In some implementations, the method 400 can further include generating a combined-subtask-specific scaling mask based on the combined subtask, wherein the combined-subtask-specific scaling mask scales one or more of the plurality of parameters of the base neural network to offset effects of the combined-subtask-specific pruning mask. In some of such implementations, generating the combined-subtask-specific pruning mask at 404 can include scaling an intermediate version of the combined-subtask-specific pruning mask according to the combined-subtask-specific scaling mask.

Referring again to FIG. 4, at 406, the computing system can prune the subset of the plurality of parameters of the base neural network identified by the combined-subtask-specific pruning mask to generate a combined-subtask-specific neural network. After pruning the subset of the plurality of parameters at 406, the computing system can, at 408, provide the combined-subtask-specific neural network for performance of the combined subtask. In some implementations, as a consequence of the pruning, the data size of the combined-subtask-specific neural network may be reduced as compared with the base neural network, since the combined-subtask-specific neural network may omit the pruned parameters. This may be beneficial for both storage and transmission of the combined-subtask-specific neural network.

In some implementations, providing the combined-subtask-specific neural network for performance of the combined subtask includes transmitting the combined-subtask-specific neural network to a computer application for storage and use by the computer application.

In some implementations, method 400 is performed in real-time responsive to an input signal that describes the combined subtask. In some of such implementations, providing the combined-subtask-specific neural network for performance of the combined subtask can include using the combined-subtask-specific neural network to perform the combined subtask in response to and contemporaneous with receipt of the input signal.

Figure 5:
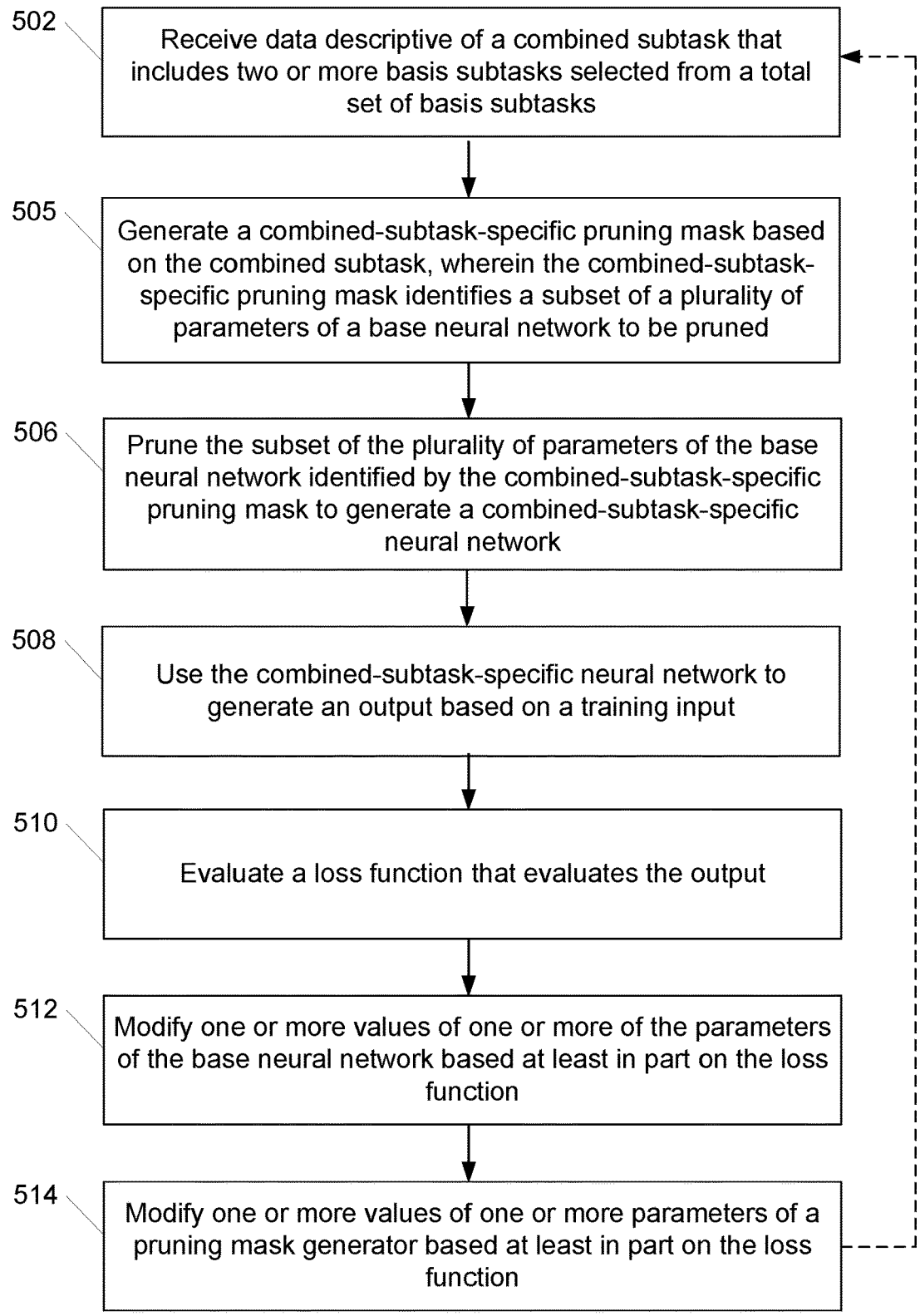
FIG. 5 provides a flow chart diagram of an example method to train a subtask adaptable neural network according to example embodiments of the present disclosure.

FIG. 5 depicts a flow chart diagram of an example method to train a subtask adaptable network according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can receive data descriptive of a combined subtask that includes two or more basis subtasks, the combined subtask being a subset of the total set of basis subtasks for which the base neural network has been trained.

In some implementations, the plurality of basis subtasks are a plurality of recognition tasks respectively associated with a plurality of different object classes. In some of such implementations, the data descriptive of a combined subtask identifies two or more of the plurality of different object classes. In some implementations, at least one of the plurality of basis subtasks includes classifying an input into two or more different classes.

At 504, the computing system can generate a combined-subtask-specific pruning mask based on the combined subtask, wherein the combined-subtask-specific pruning mask identifies a subset of the plurality of parameters of the base neural network to be pruned.

In some implementations, generating the combined-subtask-specific pruning mask based on the combined subtask can include accessing from storage two or more predetermined utility masks respectively associated with the two or more basis subtasks included in the combined subtask. In some implementations, generating the combined-subtask-specific pruning mask based on the combined subtask can include combining the two or more predetermined utility masks to generate a combined-subtask-specific utility mask. In some implementations, combining the two or more predetermined utility masks to generate the combined-subtask-specific utility mask includes performing, on an element-by-element basis, a maximum operator for the two or more predetermined utility masks.

In some implementations, generating the combined-subtask-specific pruning mask based on the combined subtask can include binarizing the combined-subtask-specific utility mask to generate the combined-subtask-specific pruning mask. In some implementations, binarizing the combined-subtask-specific utility mask to generate the combined-subtask-specific pruning mask can include comparing, on an element-by-element basis, each value of the combined-subtask-specific utility mask to a threshold value, wherein values less than the threshold value are set to zero and values greater than the threshold value are set to one.

In some implementations, the subtask adaptable neural network further includes a pruning mask generation neural network. In some implementations, generating the combined-subtask-specific pruning mask based on the combined subtask can include: inputting the data descriptive of the combined subtask into the pruning mask generation neural network; and receiving the combined-subtask-specific pruning mask as an output of the pruning mask generation neural network, the combined-subtask-specific pruning mask produced by the pruning mask generation neural network based on the data descriptive of the combined subtask.

In some implementations, the base neural network can be a convolutional neural network that includes a plurality of filters. In some implementations, the combined-subtask-specific pruning mask identifies, on a filter-by-filter basis, a subset of the plurality of filters of the base neural network to be pruned.

In some implementations, the method 500 can further include generating a combined-subtask-specific scaling mask based on the combined subtask, wherein the combined-subtask-specific scaling mask scales one or more of the plurality of parameters of the base neural network to offset effects of the combined-subtask-specific pruning mask. In some of such implementations, generating the combined-subtask-specific pruning mask at 504 can include scaling an intermediate version of the combined-subtask-specific pruning mask according to the combined-subtask-specific scaling mask.

Referring again to FIG. 5, at 506, the computing system can prune the subset of the plurality of parameters of the base neural network identified by the combined-subtask-specific pruning mask to generate a combined-subtask-specific neural network. After pruning the subset of the plurality of parameters at 506, the computing system can, at 508, use the combined-subtask-specific neural network to generate an output based on a training input.

At 510, the computing system can evaluate a loss function that evaluates the output. In some implementations, the loss function can include a sparsity-inducing term that encourages network pruning.

In some implementations, the output generated by the combined-subtask-specific neural network can include a plurality of outputs respectively for the plurality of basis subtasks. In some implementations, the loss function can include: a subtask loss term that evaluates the two or more of the plurality of outputs respectively associated with the two or more basis subtasks included in the combined subtask; and/or a remaining loss term that evaluates the outputs that are respectively associated with the basis subtasks that are not included in the combined subtask. In some implementations, the subtask loss term is weighted greater than the remaining loss term.

At 512, the computing system can modify one or more values of one or more of the parameters of the base neural network based at least in part on the loss function.

At 514, the computing system can modify one or more values of one or more parameters of a pruning mask generator based at least in part on the loss function.

In some implementations, modifying one or more values of one or more parameters of a pruning mask generator can include modifying one or more values of the two or more utility masks respectively associated with the two or more basis subtasks included in the combined subtask based at least in part on the loss function.

In some implementations, modifying one or more values of one or more parameters of a pruning mask generator can include modifying one or more values of the pruning mask generation neural network based at least in part on the loss function.

After 514, method 500 can optionally return to 512. Thus, in some implementations, method 500 can be performed iteratively. The iterative loop can stop when one or more stopping criteria are met. The stopping criteria can be any number of different criteria including as examples, a loop counter reaching a predefined maximum, iteration over iteration change in parameter adjustments falling below a threshold, the gradient being below a threshold value, and/or various other criteria.

4. Example Devices and Systems

Figure 6A:
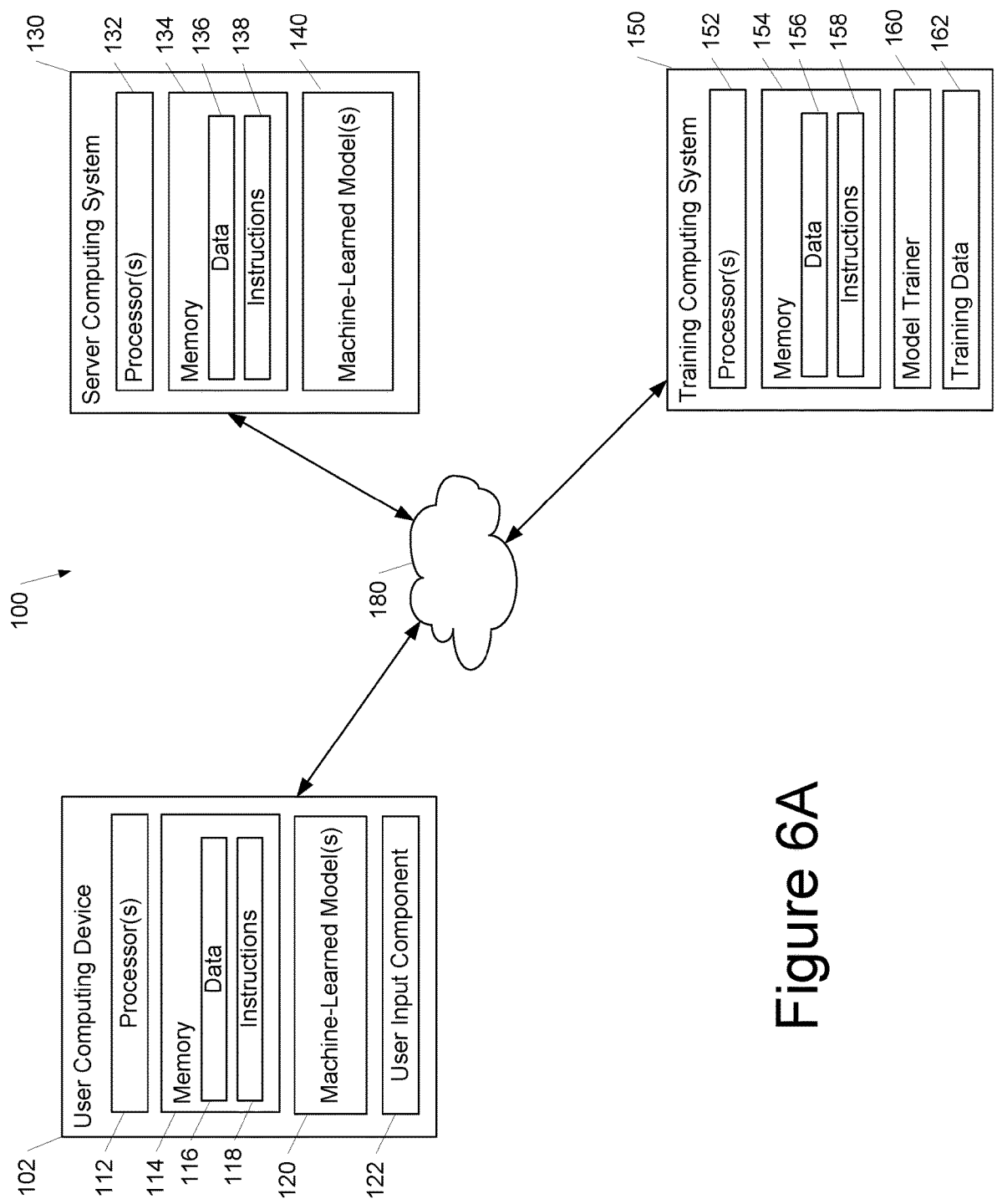
FIG. 6A depicts a block diagram of an example computing system according to example embodiments of the present disclosure.

FIG. 6A depicts a block diagram of an example computing system 100 that provides a subtask adaptable network according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feedforward neural networks, recurrent neural networks (e.g., long short-term memory recurrent neural networks), convolutional neural networks or other forms of neural networks. Example machine-learned models 120 are discussed with reference to FIGS. 1A-5.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel tasks across multiple instances of inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a network adaptation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1A-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

FIG. 6A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 6B:
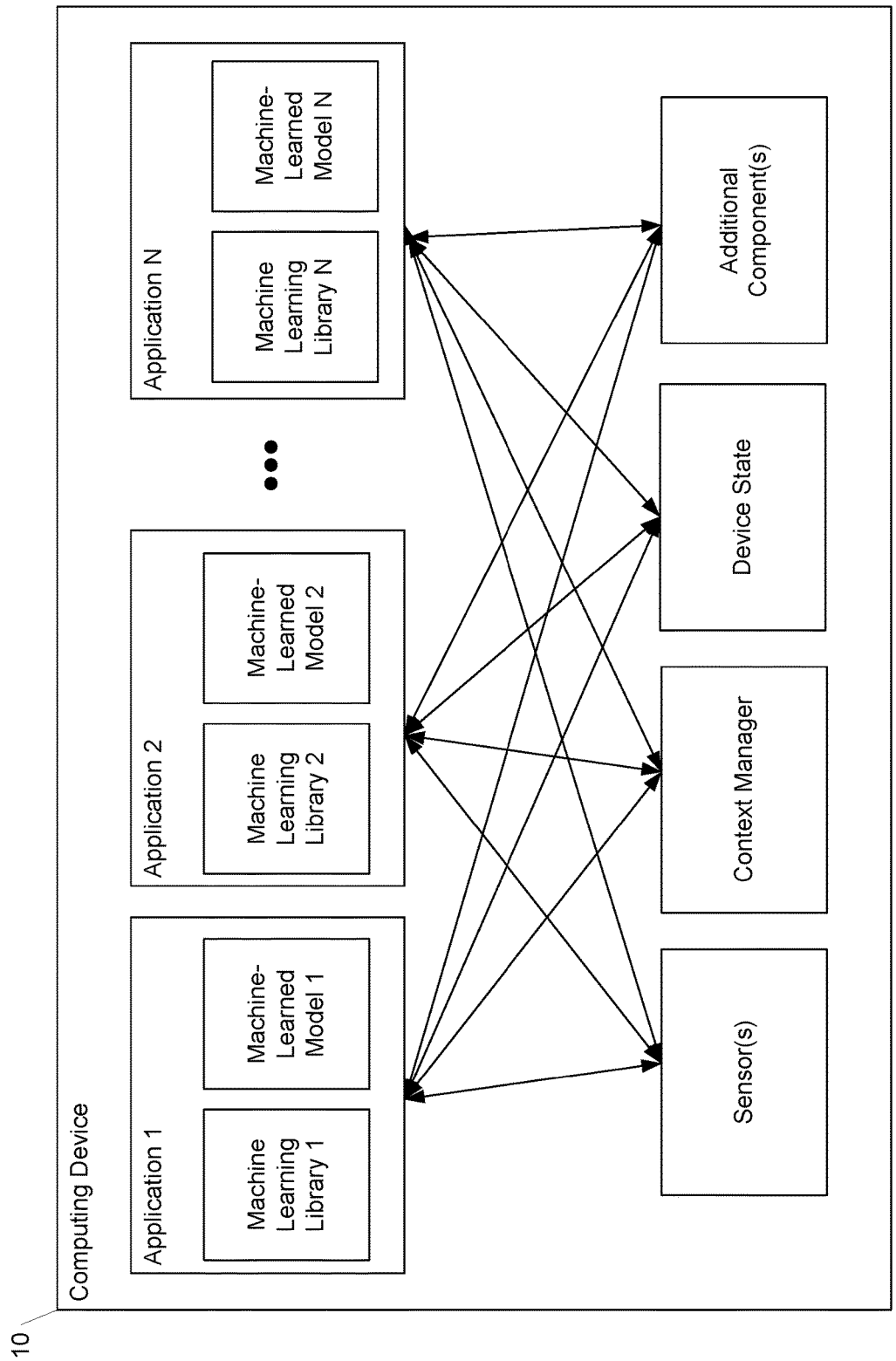
FIG. 6B depicts a block diagram of an example computing device according to example embodiments of the present disclosure.

FIG. 6B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
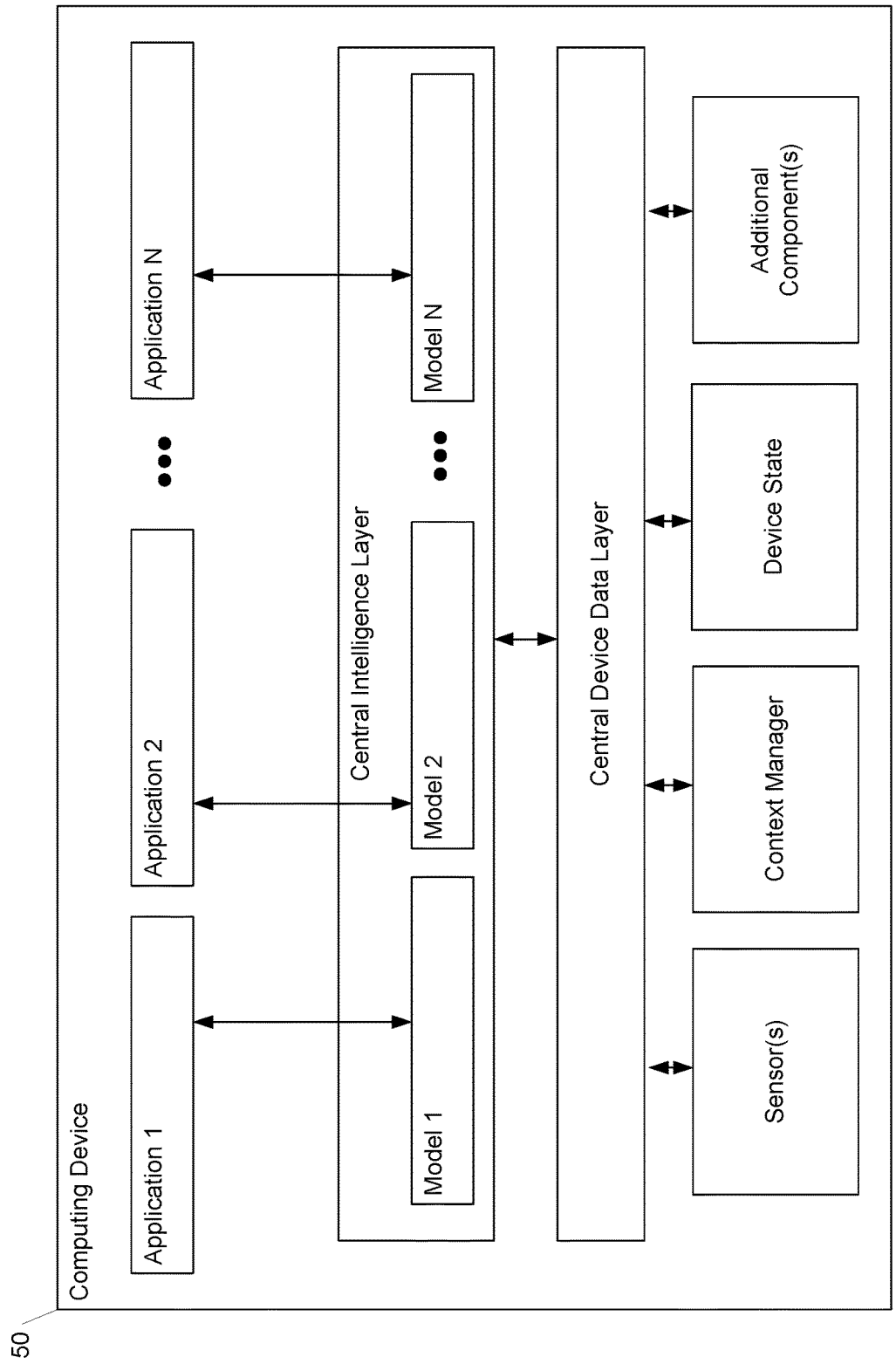
FIG. 6C depicts a block diagram of an example computing device according to example embodiments of the present disclosure.

FIG. 6C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

5. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system with a subtask adaptable neural network, the computing system comprising:
one or more processors; and
one or more non-transitory computer-readable media that collectively store:
a subtask adaptable neural network that comprises a base neural network that comprises a plurality of parameters, wherein the base neural network has been trained to perform each of a plurality of basis subtasks included in a total set of basis subtasks, and wherein the subtask adaptable neural network further comprises a pruning mask generation neural network that is separate from the base neural network; and
instructions that, when executed by the one or more processors, cause the computing system to perform operations, the operations comprising:
receiving data descriptive of a combined subtask that comprises two or more basis subtasks, the combined subtask being a subset of the total set of basis subtasks for which the base neural network has been trained;
generating a combined-subtask-specific pruning mask based on the combined subtask, wherein the combined-subtask-specific pruning mask identifies a subset of the plurality of parameters of the base neural network to be pruned, and wherein generating the combined-subtask-specific pruning mask based on the combined subtask comprises:
inputting the data descriptive of the combined subtask into the pruning mask generation neural network; and
receiving the combined-subtask-specific pruning mask as an output of the pruning mask generation neural network, the combined-subtask-specific pruning mask produced by the pruning mask generation neural network based on the data descriptive of the combined subtask;
pruning the subset of the plurality of parameters of the base neural network identified by the combined-subtask-specific pruning mask to generate a combined-subtask-specific neural network; and
after pruning the subset of the plurality of parameters, providing the combined-subtask-specific neural network for performance of the combined subtask.

2. The computing system of claim 1, wherein:
the base neural network comprises a convolutional neural network that comprises a plurality of filters; and
the combined-subtask-specific pruning mask identifies, on a filter-by-filter basis, a subset of the plurality of filters of the base neural network to be pruned.

3. The computing system of claim 1, wherein:
the operations further comprise generating a combined-subtask-specific scaling mask based on the combined subtask, wherein the combined-subtask-specific scaling mask scales one or more of the plurality of parameters of the base neural network to offset effects of the combined-subtask-specific pruning mask; and
generating the combined-subtask-specific pruning mask based on the combined subtask comprises scaling an intermediate version of the combined-subtask-specific pruning mask according to the combined-subtask-specific scaling mask.

4. The computing system of claim 1, wherein:
the plurality of basis subtasks comprise a plurality of recognition tasks respectively associated with a plurality of different object classes; and
the data descriptive of a combined subtask identifies two or more of the plurality of different object classes.

5. The computing system of claim 1, wherein at least one of the plurality of basis subtasks comprises classifying an input into two or more different classes.

6. The computing system of claim 1, wherein providing the combined-subtask-specific neural network for performance of the combined subtask comprises transmitting the combined-subtask-specific neural network to a computer application for storage and use by the computer application.

7. The computing system of claim 1, wherein:
the operations are performed in real-time responsive to an input signal that describes the combined subtask; and
providing the combined-subtask-specific neural network for performance of the combined subtask comprises using the combined-subtask-specific neural network to perform the combined subtask in response to and contemporaneous with receipt of the input signal.

8. A computer-implemented method to train a subtask adaptable neural network, the method comprising:
obtaining, by a computing system comprising one or more computing devices, a subtask adaptable neural network that comprises a base neural network that comprises a plurality of parameters, wherein the subtask adaptable neural network further comprises a pruning mask generation neural network;
for each of a plurality of training iterations:
receiving, by the computing system, data descriptive of a combined subtask that comprises two or more basis subtasks, the combined subtask being a subset of a total set of a plurality of basis subtasks;
generating, by the computing system, a combined-subtask-specific pruning mask based on the combined subtask, wherein the combined-subtask-specific pruning mask identifies a subset of the plurality of parameters of the base neural network to be pruned, wherein generating, by the computing system, the combined-subtask-specific pruning mask based on the combined subtask comprises:
inputting, by the computing system, the data descriptive of the combined subtask into the pruning mask generation neural network; and
receiving, by the computing system, the combined-subtask-specific pruning mask as an output of the pruning mask generation neural network, the combined-subtask-specific pruning mask produced by the pruning mask generation neural network based on the data descriptive of the combined subtask;

pruning, by the computing system, the subset of the plurality of parameters of the base neural network identified by the combined-subtask-specific pruning mask to generate a combined-subtask-specific neural network;

after pruning the subset of the plurality of parameters, using, by the computing system, the combined-subtask-specific neural network to generate an output based on a training input;

evaluating, by the computing system, a loss function that evaluates the output;

modifying, by the computing system, one or more values of one or more of the parameters of the base neural network based at least in part on the loss function; and modifying, by the computing system, one or more values of one or more parameters of the pruning mask generation neural network based at least in part on the loss function;

wherein the respective combined subtasks for at least two of the plurality of training iterations differ from each other.

9. The computer-implemented method of claim 8, wherein the loss function comprises a sparsity-inducing term that encourages network pruning.

10. The computer-implemented method of claim 8, wherein:
the output generated by the combined-subtask-specific neural network comprises a plurality of outputs respectively for the plurality of basis subtasks;
the loss function comprises:
a subtask loss term that evaluates the two or more of the plurality of outputs respectively associated with the two or more basis subtasks included in the combined subtask; and
a remaining loss term that evaluates the outputs that are respectively associated with the basis subtasks that are not included in the combined subtask; and
the subtask loss term is weighted greater than the remaining loss term.

11. The computer-implemented method of claim 8, wherein:
the base neural network comprises a convolutional neural network that comprises a plurality of filters; and
the combined-subtask-specific pruning mask identifies, on a filter-by-filter basis, a subset of the plurality of filters of the base neural network to be pruned.

12. The computer-implemented method of claim 8, wherein:
for each training iteration, the method further comprises generating, by the computing system, a combined-subtask-specific scaling mask based on the combined subtask, wherein the combined-subtask-specific scaling mask scales one or more of the plurality of parameters of the base neural network to offset effects of the combined-subtask-specific pruning mask; and
generating, by the computing system, the combined-subtask-specific pruning mask based on the combined subtask comprises scaling, by the computing system, an intermediate version of the combined-subtask-specific pruning mask according to the combined-subtask-specific scaling mask.

13. The computer-implemented method of claim 8, wherein:
the plurality of basis subtasks comprise a plurality of recognition tasks respectively associated with a plurality of different object classes; and
the data descriptive of a combined subtask identifies two or more of the plurality of different object classes.

14. One or more tangible, non-transitory computer-readable media that collectively store:
a combined-subtask-specific neural network generated from a base neural network;
wherein the combined-subtask-specific neural network is configured to perform a combined subtask that comprises two or more basis subtasks;
wherein the combined subtask is a subset of a total set of basis subtasks on which the base neural network was trained;
wherein the combined-subtask-specific neural network was generated via pruning of a subset of a plurality of parameters of the base neural network identified by a combined-subtask-specific pruning mask associated with the combined subtask;
wherein the combined-subtask-specific pruning mask was generated by a pruning mask generation neural network that is separate from the base neural network; and
wherein the pruning mask generation neural network is configured to receive the data descriptive of the combined subtask as an input and generate the combined-subtask-specific pruning mask as an output; and
instructions that, when executed by one or more computing devices, cause the one or more computing devices to use the combined-subtask-specific neural network for performance of the combined subtask.

* * * * *